United States Patent
Hirooka et al.

(10) Patent No.: US 12,441,270 B2
(45) Date of Patent: Oct. 14, 2025

(54) CYLINDRICAL FILTER FOR PYROTECHNIC DEVICE, MANUFACTURING METHOD FOR CYLINDRICAL FILTER, AND PYROTECHNIC DEVICE USING CYLINDRICAL FILTER

(71) Applicant: DAICEL CORPORATION, Osaka (JP)

(72) Inventors: Masato Hirooka, Tokyo (JP); Yoshiaki Nishikawa, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 581 days.

(21) Appl. No.: 16/969,380

(22) PCT Filed: Feb. 22, 2019

(86) PCT No.: PCT/JP2019/006797
§ 371 (c)(1),
(2) Date: Aug. 12, 2020

(87) PCT Pub. No.: WO2019/176504
PCT Pub. Date: Sep. 19, 2019

(65) Prior Publication Data
US 2021/0046896 A1 Feb. 18, 2021

(30) Foreign Application Priority Data
Mar. 12, 2018 (JP) .................. 2018-044289

(51) Int. Cl.
*B01D 39/00* (2006.01)
*B01D 39/10* (2006.01)
(Continued)

(52) U.S. Cl.
CPC ............ *B60R 21/264* (2013.01); *B01D 39/10* (2013.01); *B01D 46/2403* (2013.01); *B01D 2279/10* (2013.01); *B60R 2021/26011* (2013.01)

(58) Field of Classification Search
CPC ........ B60R 21/264; B60R 2021/26011; B01D 39/10; B01D 46/2403; B01D 2279/10
(Continued)

(56) References Cited

U.S. PATENT DOCUMENTS 8,276,521 B2 * 10/2012 Reichelt ............. B60R 21/2644
280/736
8,328,234 B2 * 12/2012 Chen .................. B60R 21/2644
55/525
(Continued)

FOREIGN PATENT DOCUMENTS

CN         1216759 C    8/2005
DE      197 26 418 A1  12/1998
(Continued)

OTHER PUBLICATIONS

Indian Office Action for Indian Application No. 202017029355, dated Jun. 30, 2022, with English translation.
(Continued)

*Primary Examiner* — T. Bennett McKenzie
(74) *Attorney, Agent, or Firm* — Birch, Stewart, Kolasch & Birch, LLP

(57) ABSTRACT

A cylindrical filter for a pyrotechnic device, including a gas generating agent or pressurized gas as a gas generation source, includes a first annular end surface, a second annular end surface positioned opposite to the first annular end surface, and a cylindrical wall surface between the first annular end surface and the second annular end surface. At least one of the first and second annular end surfaces
(Continued)

includes a weakened portion. The weakened portion, when provided in the first annular end surface, includes a first annular wall portion protruding from the first annular end surface and has a thickness less than a thickness of the first annular end surface. The weakened portion, when provided in the second annular end surface, includes a second annular wall portion protruding from the second annular end surface and has a thickness less than a thickness of the second annular end surface.

10 Claims, 5 Drawing Sheets

(51) Int. Cl.
    *B01D 46/24*     (2006.01)
    *B60R 21/264*     (2006.01)
    *B60R 21/26*     (2011.01)

(58) Field of Classification Search
    USPC .............................. 55/385.3; 280/736, 740
    See application file for complete search history.

(56) References Cited

U.S. PATENT DOCUMENTS

| | | | | |
|---|---|---|---|---|
| 8,585,792 | B2 * | 11/2013 | Zengerle | ............... B01D 39/12 242/360 |
| 2003/0222443 | A1 | 12/2003 | Cheal et al. | |
| 2005/0011393 | A1 | 1/2005 | Kelly et al. | |
| 2007/0182141 | A1 * | 8/2007 | Yamazaki | ............. B60R 21/264 280/736 |
| 2007/0214768 | A1 * | 9/2007 | Koyama | ................ B01D 39/12 55/282 |
| 2009/0315307 | A1 * | 12/2009 | Neumayer | .......... B60R 21/2644 280/741 |
| 2010/0146922 | A1 * | 6/2010 | Greenwood | ......... B01D 39/086 29/469 |
| 2011/0300030 | A1 | 12/2011 | Hatomoto | |
| 2013/0291756 | A1 * | 11/2013 | Ohsugi | ..................... B01J 7/00 102/530 |

FOREIGN PATENT DOCUMENTS

| | | | | |
|---|---|---|---|---|
| DE | 603 07 096 T2 | 2/2007 | | |
| EP | 1 053 916 A1 | 11/2000 | | |
| JP | 2005-528276 A | 9/2005 | | |
| JP | 2008-159153 A | 6/2008 | | |
| JP | 2009-214746 A | 9/2009 | | |
| JP | 2010234843 A * | 10/2010 | | |
| JP | 2011255750 A * | 12/2011 | ............. | B01D 39/12 |
| JP | 5158651-82 | 3/2013 | | |
| WO | WO-2017130735 A1 * | 8/2017 | ................ | B01J 7/00 |

OTHER PUBLICATIONS

German Office Action for German Application No. 112019001313.0, dated Feb. 21, 2024, with an English translation.

* cited by examiner

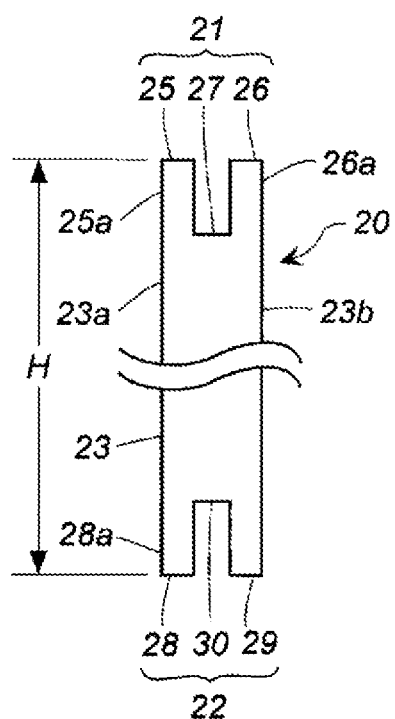
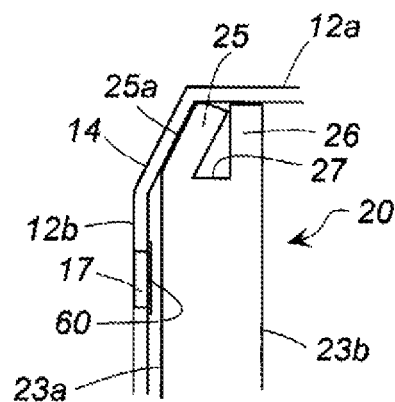
FIG. 3A  FIG. 3B
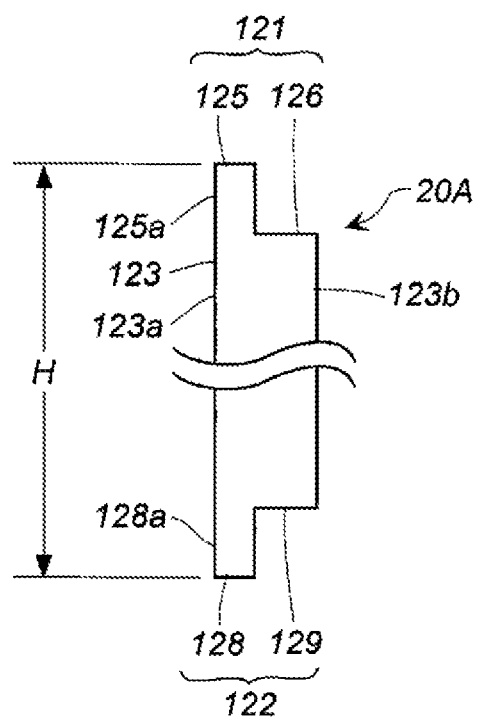
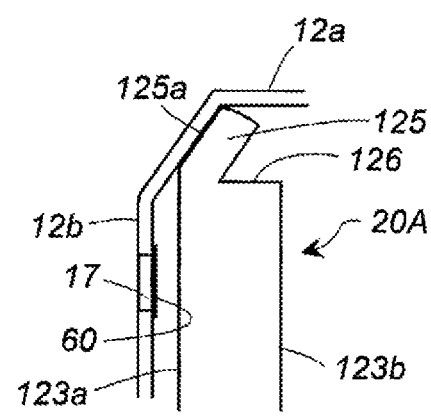
FIG. 4A  FIG. 4B

CYLINDRICAL FILTER FOR PYROTECHNIC DEVICE, MANUFACTURING METHOD FOR CYLINDRICAL FILTER, AND PYROTECHNIC DEVICE USING CYLINDRICAL FILTER

TECHNICAL FIELD

The present invention relates to a cylindrical filter for a pyrotechnic device suitable as a gas generator and the like used in an airbag device, a manufacturing method for the cylindrical filter, and a pyrotechnic device using the cylindrical filter.

BACKGROUND ART

A pyrotechnic device such as a gas generator using a gas generating agent or pressurized gas as a gas generation source is widely used in an airbag device or the like installed in an automobile. In such a pyrotechnic device, a filter is used for cooling combustion gas generated by combustion of the gas generating agent, and capturing residues and metal fragments in the gas.

JP2011-255750A describes an invention of a cylindrical filter for a gas generator.

It is described that a cylindrical filter 10 can be manufactured by winding as illustrated in FIG. 4 an elongated punched metal 40 illustrated in FIG. 5, and welding and fixing a winding end (paragraphs 0042 and 0035 to 0037).

It is described that the cylindrical filter 10 is in close contact with a flat surface of a top plate 101a and a flat surface of a bottom plate 102a by crushing both end surfaces 11a and 11b when the cylindrical filter 10 is used as a component of a gas generator 100 (paragraph 0049).

JP5158651B describes an invention of an inflator.

As illustrated in FIGS. 1 and 2, a filter material 25 includes a cylindrical portion 26 extending along an axial direction. A plurality of openings 27 are formed in the cylindrical portion 26, and a bent portion 28a is provided at an end portion on a top plate portion 10 side of an upper case 9, which is one end portion in the axial direction (paragraph number 0039).

The filter material 25 is assembled to a housing by being sandwiched in the axial direction between a lower case 3 and the upper case 9. The bent portion 28a is elastically deformed by abutting the upper case 9, and functions as an elastic force exhibiting portion that exhibits an elastic force in the axial direction of the filter material 25 and is pressed against the upper case 9. In this way, an axial length of the filter material 25 during assembly to the housing is reduced, and the filter material 25 is in contact substantially as an annular line with a bottom plate portion 4 of the lower case 3 and the top plate portion 10 of the upper case 9 with a moderate force, and is stably fixed relative to the housing with tolerances of dimensional accuracy between the members (paragraph 0044).

SUMMARY OF INVENTION

The present invention provides a cylindrical filter (cylindrical filter in a first aspect) for a pyrotechnic device including a gas generating agent or pressurized gas as a gas generation source, the cylindrical filter comprising: a first annular end surface; a second annular end surface positioned opposite to the first annular end surface in an axial direction; and a cylindrical wall surface between the first annular end surface and the second annular end surface, wherein at least one of the first annular end surface or the second annular end surface includes a weakened portion, a weakened portion includes a first annular wall portion that protrudes from the first annular end surface and has a thickness less than a thickness of the first annular end surface when the first annular end surface includes the weakened portion, and a weakened portion includes a second annular wall portion that protrudes from the second annular end surface and has a thickness less than a thickness of the second annular end surface when the second annular end surface includes the weakened portion.

Furthermore, the present invention provides a manufacturing method for the cylindrical filter for a pyrotechnic device according to any one of the first aspect described above and second and third aspects described below, the manufacturing method comprising winding an elongated filter material having a partially increased/decreased width, and welding and fixing a winding start and a winding end.

Furthermore, the present invention provides a pyrotechnic device that accommodates an ignition device, the gas generating agent or pressurized gas serving as the gas generation source, and the cylindrical filter in a housing including a gas discharge port, the housing being formed of a top plate, a bottom plate positioned opposite to the top plate in the axial direction, and a peripheral wall portion between the top plate and the bottom plate, the housing including an annular inclined surface on at least one of a part of the top plate, a boundary portion between the top plate and the peripheral wall portion, a part of the bottom plate, or a boundary portion between the bottom plate and the peripheral wall portion, at least one of the weakened portion of the first annular end surface or the weakened portion of the second annular end surface of the cylindrical filter according to any of the first aspect described above and second and third aspects described below being deformed in a radial direction, the cylindrical filter being disposed in a gas discharge path to which combustion gas generated by burning the gas generating agent is discharged from the gas discharge port, and the weakened portion deformed being, as an annular surface, in contact with an inner surface of the annular inclined surface.

BRIEF DESCRIPTION OF DRAWINGS

The present invention will be more fully understood from the detailed description given herein below and the accompanying drawings, which are given for explanation only and do not limit the present invention.

FIG. 3A is a partial cross-sectional view in an axial direction of the cylindrical filter in FIG. 2, and FIG. 3B is a partial cross-sectional view in the axial direction illustrating a state (a state of deformation of a weakened portion) when the cylindrical filter in FIG. 3A is disposed in a housing.

FIG. 4A is a partial cross-sectional view in the axial direction of the cylindrical filter different from that illustrated in FIG. 2, and FIG. 4B is a partial cross-sectional view in the axial direction illustrating a state of deformation of a weakened portion corresponding to FIG. 3B.

DESCRIPTION OF EMBODIMENTS

Figure 1:
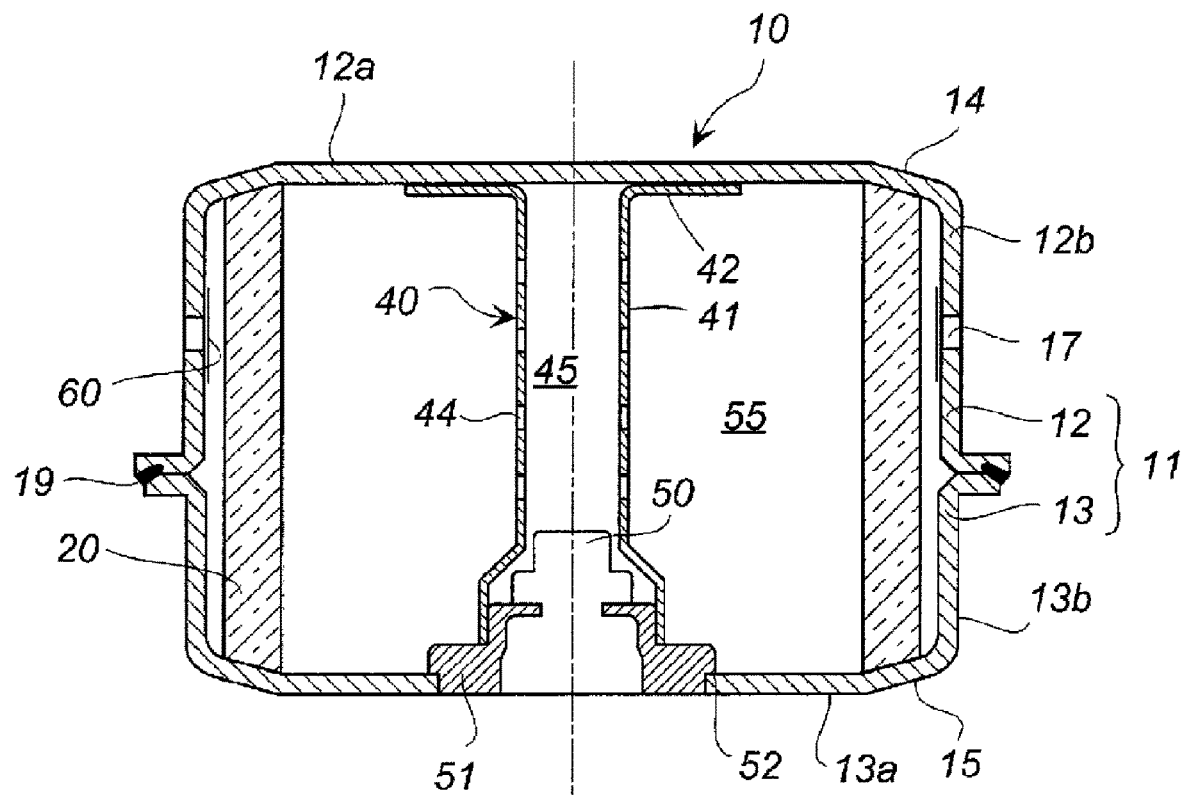
FIG. 1 is a cross-sectional view in an axis direction of a gas generator to which a cylindrical filter according to an embodiment of the present invention can be applied.

The present invention provides a cylindrical filter for a pyrotechnic device that can be used in a gas generator for an airbag device, a manufacturing method for the cylindrical filter, and a pyrotechnic device using the cylindrical filter.

The cylindrical filter according to an embodiment of the present invention is used for a pyrotechnic device including only a gas generating agent as a gas generation source, a pyrotechnic device including both a gas generating agent and pressurized gas as a gas generation source, or a pyrotechnic device using pressurized gas as a gas generation source.

The pyrotechnic device includes a gas generator and the like used in an airbag device mounted in an automobile.

The cylindrical filter includes a first annular end surface, a second annular end surface positioned opposite to the first annular end surface in an axial direction, and a cylindrical wall surface between the first annular end surface and the second annular end surface. The cylindrical wall surface is formed of a cylindrical inner wall surface on the inner side and a cylindrical outer wall surface on the outer side.

In the cylindrical filter, any one or both of the first annular end surface and the second annular end surface include a weakened portion. The weakened portion may be deformed and thus inclined (tilted) in a deformation direction of the weakened portion that is inward in a radial direction or outward in the radial direction. Further, the deformation direction of the weakened portion may include a deformed portion into the axial direction.

The weakened portion when the first annular end surface includes the weakened portion includes a first annular wall portion that protrudes from the first annular end surface and has a thickness less than a thickness of the first annular end surface. The first annular wall portion is continuous in a circumferential direction. Here, "continuous in the circumferential direction" may be continuous substantially in the circumferential direction after deformation of the first annular wall portion. For example, a plurality of annular wall portions serving as a weakened portion are formed at an interval in the circumferential direction before the pyrotechnic device is assembled, but a case where the annular wall portion abuts a housing inner wall surface or a retainer in a housing without a gap by deformation after the pyrotechnic device is assembled is not eliminated.

The weakened portion when the second annular end surface includes the weakened portion includes a second annular wall portion that protrudes from the second annular end surface and has a thickness less than a thickness of the second annular end surface. The second annular wall portion serving as the weakened portion is continuous in the circumferential direction.

The weakened portion is a portion that is preferentially deformed when an external force is applied. When the cylindrical filter is disposed in the housing in a step of assembling the pyrotechnic device, the weakened portion of the cylindrical filter is deformed while abutting a different member such as the housing inner wall surface or the retainer disposed in the housing, and is thus configured to enhance steady contact between the housing inner wall surface or the different member and the cylindrical filter. Therefore, the weakened portion is deformed in a direction along an abutment surface with the housing inner wall surface or the different member such as the retainer. Note that the direction in which the weakened portion (the first annular wall portion and the second annular wall portion) formed on the first annular end surface or the second annular end surface as the cylindrical filter does not necessarily need to be the axial direction of the filter, and may be inclined inward or outward in the radial direction.

When the cylindrical filter is disposed in the housing of the pyrotechnic device, there are an embodiment in which an external force is applied to only the weakened portion including the first annular wall portion of the first annular end surface, an embodiment in which an external force is applied to only the weakened portion including the second annular wall portion of the second annular end surface, and an embodiment in which an external force is applied to both the weakened portion including the first annular wall portion of the first annular end surface and the weakened portion including the second annular wall portion of the second annular end surface, in accordance with a shape of the housing or other member such as a retainer disposed in the housing, and the cylindrical filter in the first aspect includes all of these embodiments.

Filters to which the technique according to an embodiment of the present invention can be applied can be used for known filters, such as filters formed by winding a punched metal, a lath metal, an expanded metal, and the like in multiple layers, in addition to the compressed molding filter disclosed in JP10-119705A.

In a preferred aspect (cylindrical filter in a second aspect) of the cylindrical filter in the first aspect, when the first annular end surface includes a weakened portion including a first annular wall portion, the weakened portion is one selected from a first outer annular wall portion extending in the axial direction along a cylindrical outer wall surface of the cylindrical filter, a first inner annular wall portion extending in the axial direction along a cylindrical inner wall surface of the cylindrical filter, and a combination of the first outer annular wall portion and the first inner annular wall portion, and a thickness of each of the first outer annular wall portion and the first inner annular wall portion is less than ½ of a thickness of the first annular end surface, and, when the second annular end surface includes a weakened portion including a second annular wall portion, the weakened portion is one selected from a second outer annular wall portion extending in the axial direction along a cylindrical outer wall surface of the cylindrical filter, a second inner annular wall portion extending in the axial direction along a cylindrical inner wall surface of the cylindrical filter, and a combination of the second outer annular wall portion and the second inner annular wall portion, and a thickness of each of the second outer annular wall portion and the second inner annular wall portion is less than ½ of a thickness of the second annular end surface.

When the cylindrical filter is disposed in the housing of the pyrotechnic device, there is an embodiment in which an external force is applied to only the first outer annular wall portion of the first annular end surface, an embodiment in which an external force is applied to only the first inner annular wall portion, and an embodiment in which an external force is applied to both the first outer annular wall portion and the first inner annular wall portion, in accordance with a shape of the housing or other member such as a retainer disposed in the housing, and the cylindrical filter in the second aspect can correspond to all of these embodiments.

Similarly, there is an embodiment in which an external force is applied to only the second outer annular wall portion of the second annular end surface, an embodiment in which an external force is applied to only the second inner annular wall portion, and an embodiment in which an external force is applied to both the second outer annular wall portion and the second inner annular wall portion, and the cylindrical filter in the second aspect includes all of these embodiments.

A first annular end surface portion without the first outer annular wall portion or the first inner annular wall portion of the first annular end surface being formed is a portion (non-weakened portion) that does not become deformed even when an external force is applied, and forms a space for allowing deformation of the first outer annular wall portion inward in the radial direction or deformation of the first inner annular wall portion outward in the radial direction. For example, the space is a first annular groove along the circumferential direction of the first annular end surface. The first annular end surface is a portion (non-weakened portion) that does not become deformed even when an external force is applied, and the first annular groove forms a space for allowing deformation of the first outer annular wall portion inward in the radial direction or deformation of the first inner annular wall portion outward in the radial direction.

Further, the first annular groove may be a plurality of discontinuous grooves as long as the plurality of discontinuous grooves are not resistant to deformation of the first outer annular wall portion or the first inner annular wall portion.

A thickness of the first outer annular wall portion or the first inner annular wall portion formed on the first annular end surface is less than ½ of a thickness of the first annular end surface. A total thickness of the first outer annular wall portion and the first inner annular wall portion formed on the first annular end surface is preferably equal to or less than ⅔ of a thickness of the first annular end surface.

In the embodiment in which an external force is applied to only the first outer annular wall portion of the first annular end surface, the first outer annular wall portion is deformed and thus bent inward in the radial direction and is pressed as an annular surface against an inner wall surface of the housing (or the retainer).

In the embodiment in which an external force is applied to only the first inner annular wall portion of the first annular end surface, the first inner annular wall portion is deformed and thus bent outward in the radial direction and is pressed as an annular surface against the inner wall surface of the housing (or the retainer).

In the embodiment in which an external force is applied to both the first outer annular wall portion and the first inner annular wall portion of the first annular end surface, the first outer annular wall portion and the first inner annular wall portion are deformed and thus bent outward in the radial direction or inward in the radial direction, and are pressed as an annular surface against the inner wall surface of the housing (or the retainer).

The second outer annular wall portion and the second inner annular wall portion of the second annular end surface are also deformed similarly to the first outer annular wall portion and the first inner annular wall portion of the first annular end surface described above, and are pressed as an annular surface against the inner wall surface of the housing (or the retainer).

A thickness of the second outer annular wall portion or the second inner annular wall portion formed on the second annular end surface is less than ½ of a thickness of the second annular end surface. A total thickness of the second outer annular wall portion and the second inner annular wall portion formed on the second annular end surface is preferably equal to or less than ⅔ of a thickness of the second annular end surface.

In addition, there is an embodiment in which, in accordance with a housing shape (or a retainer shape), the first inner annular wall portion of the first annular end surface is deformed and thus bent outward in the radial direction and pressed as an annular surface against the inner wall surface of the housing (or the retainer), and the second outer annular wall portion of the second annular end surface is deformed and thus bent inward in the radial direction and pressed as an annular surface against the inner wall surface of the housing (or the retainer), or an embodiment opposite to the above-described embodiment.

In a preferred aspect (cylindrical filter in a third aspect) of the cylindrical filter in the first aspect, when the first annular end surface includes the weakened portion including a first annular wall portion, the weakened portion includes a first intermediate annular wall portion extending in the axial direction at an interval in a thickness direction from a cylindrical outer wall surface of the cylindrical filter, and a range from the first intermediate annular wall portion to a first outer corner portion that is a boundary portion between the first annular end surface and the cylindrical outer wall surface or a range from the first intermediate annular wall portion to a first inner corner portion that is a boundary portion between the first annular end surface and a cylindrical inner wall surface, and a thickness of the first intermediate annular wall portion has a thickness equal to or less than ½ of a thickness of the first annular end surface, and a distance (L1) from an intermediate position of a thickness of the first intermediate annular wall portion to the cylindrical outer wall surface and a distance (L2) from the intermediate position of the thickness of the first intermediate annular wall portion to the cylindrical inner wall surface satisfy a relationship of L1<L2, L1=L2, or L1>L2, and, when the second annular end surface includes the weakened portion including a second annular wall portion, the weakened portion includes a second intermediate annular wall portion extending in the axial direction at an interval in a thickness direction from the cylindrical outer wall surface of the cylindrical filter, and a range from the second intermediate annular wall portion to a second outer corner portion that is a boundary portion between the second annular end surface and the cylindrical outer wall surface or a range from the second intermediate annular wall portion to a second inner corner portion that is a boundary portion between the second annular end surface and the cylindrical inner wall surface, and a thickness of the second intermediate annular wall portion has a thickness equal to or less than ½ of a thickness of the second annular end surface, and a distance (L11) from an intermediate position of a thickness of the second intermediate annular wall portion to the cylindrical outer wall surface and a distance (L12) from the intermediate position of the thickness of the second intermediate annular wall portion to the cylindrical inner wall surface satisfy a relationship of L11<L12, L11=L12, or L11>L12.

The cylindrical filter in the third aspect is different from the cylindrical filter in the second aspect in the positioning of a weakened portion of the first annular end surface and the second annular end surface.

The weakened portion of the first annular end surface of the cylindrical filter in the third aspect is two of (i) and (ii) or of (i) and (iii), among (i) a first intermediate annular wall portion extending in the axial direction at an interval in a thickness direction from a cylindrical outer wall surface of the cylindrical filter, (ii) a range from the first intermediate annular wall portion to a first outer corner portion being a boundary portion between the first annular end surface and the cylindrical outer wall surface, and (iii) a range from the first intermediate annular wall portion extending in the axial direction at an interval in a thickness direction from a cylindrical inner wall surface of the cylindrical filter to a first inner corner portion being a boundary portion between the first annular end surface and the cylindrical inner wall surface.

In the weakened portions, when an external force is applied, the first intermediate annular wall portion and the range from the first intermediate annular wall portion to the first outer corner portion are deformed, or the first intermediate annular wall portion and the range from the first intermediate annular wall portion to the first inner corner portion are deformed. The first intermediate annular wall portion is continuous in the circumferential direction.

The weakened portion of the second annular end surface of the cylindrical filter in the third aspect is two of (iv) and (v) or of (iv) and (vi), among (iv) a second intermediate annular wall portion extending in the axial direction at an interval in a thickness direction from a cylindrical outer wall surface of the cylindrical filter, (v) a range from the second intermediate annular wall portion to a second outer corner portion being a boundary portion between the second annular end surface and the cylindrical outer wall surface, and (vi) a range from the second intermediate annular wall portion extending in the axial direction at an interval in a thickness direction from a cylindrical inner wall surface of the cylindrical filter to a second inner corner portion being a boundary portion between the second annular end surface and the cylindrical inner wall surface.

In the weakened portions, when an external force is applied, the second intermediate annular wall portion and the range from the second intermediate annular wall portion to the second outer corner portion are deformed, or the second intermediate annular wall portion and the range from the second intermediate annular wall portion to the second inner corner portion are deformed. The second intermediate annular wall portion is continuous in the circumferential direction.

A thickness of the first intermediate annular wall portion has a thickness equal to or less than ½ of a thickness of the first annular end surface, and is preferably a thickness of ⅓ to ½ of a thickness of the first annular end surface.

Further, a distance ($L1$) from an intermediate position of the thickness of the first intermediate annular wall portion to the cylindrical outer wall surface and a distance ($L2$) from the intermediate position of the thickness of the first intermediate annular wall portion to the cylindrical inner wall surface satisfy $L1<L2$, $L1=L2$, or $L1>L2$. When $L1<L2$, $L2/L1$ is preferably in a range from 1.2 to 2.2. When $L1>L2$, $L1/L2$ is preferably in a range from 1.2 to 2.2.

A thickness of the second intermediate annular wall portion has a thickness equal to or less than ½ of a thickness of the second annular end surface, and is preferably a thickness of ⅓ to ½ of a thickness of the second annular end surface.

Further, a distance ($L11$) from an intermediate position of the thickness of the second intermediate annular wall portion to the cylindrical outer wall surface and a distance ($L12$) from the intermediate position of the thickness of the second intermediate annular wall portion to the cylindrical inner wall surface satisfy $L11<L12$, $L11=L12$, or $L11>L12$. When $L11<L12$, $L12/L11$ is preferably in a range from 1.2 to 2.2. When $L11>L12$, $L11/L12$ is preferably in a range from 1.2 to 2.2.

A pyrotechnic device according to an embodiment of the present invention can be used as a gas generator and the like for an airbag device mounted in an automobile, and uses the cylindrical filter according to any of the first aspect to the third aspect described above as a cylindrical filter.

The pyrotechnic device according to an embodiment of the present invention uses a gas generating agent as a gas generation source, and includes a pyrotechnic device that uses only a gas generating agent as a gas generation source and a pyrotechnic device that uses both a gas generating agent and pressurized gas as a gas generation source.

A housing of the gas generator includes an annular inclined surface on at least one of a part of the top plate, a boundary portion between the top plate and the peripheral wall portion, a part of the bottom plate, or a boundary portion between the bottom plate and the peripheral wall portion. The annular inclined surface is preferably formed on both the top plate and the bottom plate facing each other in the axial direction.

At least one of the weakened portion of the first annular end surface or the weakened portion of the second annular end surface of the cylindrical filter is deformed inward in the radial direction or outward in the radial direction, and thus an abutment surface is formed. An inner surface of the annular inclined surface and the abutment surface are in close contact with each other, and thus a short-pass of combustion gas from the abutment portion is prevented.

Here, the short-pass is that of combustion gas or pressurized gas generated from the gas generating agent passing between the first and second annular end surfaces of the cylindrical filter and the housing or other member such as the retainer disposed in the housing, and reaching a gas discharge port without passing through the cylindrical filter.

In the invention of the inflator in JP2011-255750A, the contact portion between the housing and the filter is an annular line. However, in the pyrotechnic device according to an embodiment of the present invention, the contact portion between the housing and the cylindrical filter is an annular surface, and thus steady contact is further enhanced, and the effect of preventing the short-pass described above is also enhanced.

Note that, when a pyrotechnic device that uses pressurized gas as a gas generation source is used as the pyrotechnic device, the cylindrical filter also functions to capture a fracture piece of a rupture plate used to encapsulate the pressurized gas.

In a preferred aspect of the invention of the pyrotechnic device described above, an annular inclined surface formed on a part of the top plate is inclined from outward in a radial direction to inward in the radial direction, and thus an interval between the top plate and the bottom plate is shortened (first top plate annular inclined surface), an inclined surface portion formed on a boundary portion between the top plate and the peripheral wall portion is inclined outward in the radial direction, and thus an interval between the top plate and the bottom plate is shortened (second top plate annular inclined surface), an annular inclined surface formed on a part of the bottom plate is inclined from outward in the radial direction to inward in the radial direction, and thus an interval between the bottom plate and the top plate is shortened (first bottom plate annular inclined surface), and an inclined surface portion formed on a boundary portion between the bottom plate and the peripheral wall portion is inclined outward in the radial direction, and thus an interval between the top plate and the bottom plate is shortened (second bottom plate annular inclined surface).

A relationship between the respective annular inclined surfaces described above when the cylindrical filter in the second aspect is used will be described.

When the cylindrical filter in the second aspect including the first inner annular wall portion or the combination of the first outer annular wall portion and the first inner annular wall portion is disposed in the housing including the first top plate annular inclined surface, the first inner annular wall portion is deformed and thus bent outward in the radial direction, and thus the first top plate annular inclined surface and the annular inner surface of the first inner annular wall portion abut each other as annular surfaces. As a result, the steady contact is enhanced, and the short-pass of the combustion gas from the abutment portion is prevented.

When the cylindrical filter in the second aspect including the first outer annular wall portion or the combination of the first outer annular wall portion and the first inner annular wall portion is disposed in the housing including the second top plate annular inclined surface, the first outer annular wall portion is deformed and thus bent inward in the radial direction, and thus the second top plate annular inclined surface and the annular outer surface of the first outer annular wall portion abut each other as annular surfaces. As a result, the steady contact is enhanced, and the short-pass of the combustion gas from the abutment portion is prevented.

When the cylindrical filter in the second aspect including the second inner annular wall portion or the combination of the second outer annular wall portion and the second inner annular wall portion is disposed in the housing including the first bottom plate annular inclined surface, the second inner annular wall portion is deformed and thus bent outward in the radial direction, and thus the first bottom plate annular inclined surface and the annular inner surface of the second inner annular wall portion abut each other as annular surfaces. As a result, the steady contact is enhanced, and the short-pass of the combustion gas from the abutment portion is prevented.

When the cylindrical filter in the second aspect including the second outer annular wall portion or the combination of the second outer annular wall portion and the second inner annular wall portion is disposed in the housing including the second bottom plate annular inclined surface, the second outer annular wall portion is deformed and thus bent inward in the radial direction, and thus the annular outer surface of the second outer annular wall portion abuts, as an annular surface, the second bottom plate annular inclined surface. As a result, the steady contact is enhanced, and the short-pass of the combustion gas from the abutment portion is prevented.

In the pyrotechnic device using the cylindrical filter according to an embodiment of the present invention, the steady contact at the contact portion between the cylindrical filter and the housing inner wall surface or other member such as the retainer is enhanced.

The cylindrical filter according to an embodiment of the present invention can be used as a filter of a pyrotechnic device such as a gas generator for an airbag device mounted in an automobile.

Embodiments of the Invention

Figure 2:
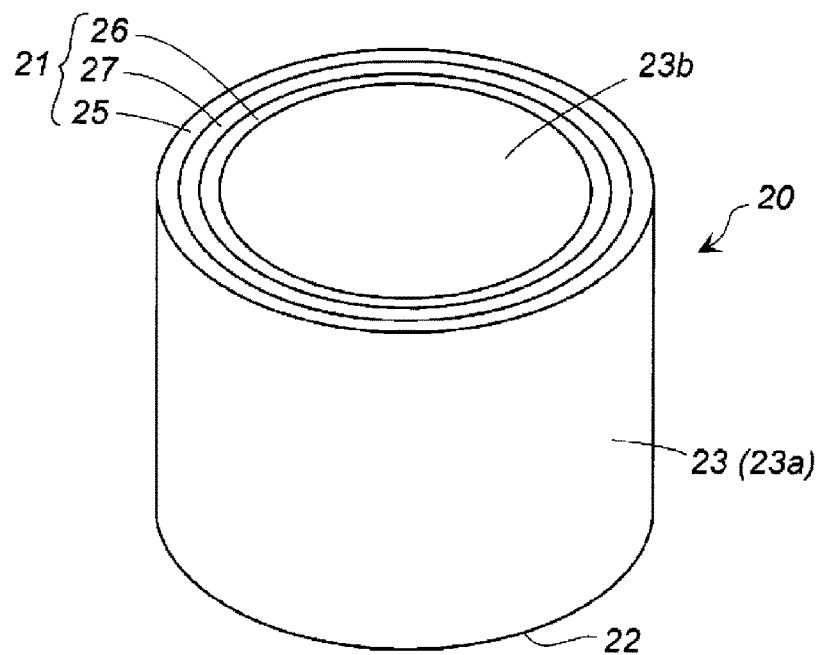
FIG. 2 is a perspective view illustrating an embodiment of the cylindrical filter according to the present invention.

Gas Generator Illustrated in FIGS. 1 to 3

Hereinafter, a cylindrical filter and a pyrotechnic device (gas generator) using the cylindrical filter according to an embodiment of the present invention will be described. The pyrotechnic device according to an embodiment of the present invention is characterized by a relationship between the cylindrical filter and an inner wall surface shape of a housing for fixing the cylindrical filter or other member such as a retainer, and other components may be the same as those of known gas generators.

A gas generator 10 illustrated in FIG. 1 has an outer shell container formed by a housing 11 formed by bonding a diffuser shell 12 that forms a top plate 12a and an upper peripheral wall portion 12b, and a closure shell 13 that forms an internal accommodation space together with the diffuser shell 12 and forms a bottom plate 13a and a lower peripheral wall portion 13b.

The diffuser shell 12 and the closure shell 13 are bonded together by laser welding or the like at a welding portion 19, and one peripheral wall portion (a combination of the upper peripheral wall portion 12b and the lower peripheral wall portion 13b) is formed by the welding.

An upper annular inclined surface 14 is provided on an annular contact portion of the top plate 12a and the upper peripheral wall portion 12b of the diffuser shell 12, and a lower annular inclined surface 15 is provided on an annular contact portion of the bottom plate 13a and the lower peripheral wall portion 13b of the closure shell 13. Both of the upper annular inclined surface 14 and the lower annular inclined surface 15 are inclined from inward in the radial direction to outward in the radial direction of the housing, and thus a distance between the top plate 12a and the bottom plate 13a is reduced.

The diffuser shell 12 is provided with a required number of gas discharge ports 17, and is blocked by an aluminum sealing tape 60 for moisture prevention. In FIG. 1, the plurality of gas discharge ports 17 has a single diameter, but may have different diameters.

A cylindrical filter 20 is disposed in the housing 11, and a tubular member 40 is disposed inside the cylindrical filter 20.

The tubular member 40 includes a tubular main body portion 41 and an annular flat surface 42 that is integrally formed with the main body portion 41 and extends in the radial direction of the housing from an opening portion edge on one end side.

The internal space of the tubular member 40 serves as a first combustion chamber 45, and the external space serves as a second combustion chamber 55.

In the first combustion chamber 45, an igniter 50 is accommodated together with a required amount of a first gas generating agent (not illustrated) and an ignition agent that serve as an ignition means. The first gas generating agent is ignited and burned by operation of the igniter 50, ignites and burns a second gas generating agent in the second combustion chamber 55, and generates gas that serves as an airbag inflation medium, and the gas generated by the combustion of the first gas generating agent is also used for inflation of the airbag.

A plurality of communication holes 44 are provided in the main body portion 41 of the tubular member 40 at regular intervals in the circumferential direction and the axial direction, and the first combustion chamber 45 and the second combustion chamber 55 communicate with each other by the communication holes 44. The communicating hole 44 is blocked by an aluminum sealing tape from the outside of the main body portion 41. Since the communication holes 44 are provided in such an arrangement state, a flame and high-temperature gas generated from the first combustion chamber 45 spread evenly into the second combustion chamber 55, and thus ignitability of the second gas generating agent in the second combustion chamber 55 is improved.

In the tubular member 40, the annular flat surface 42 abuts the top plate 12a. The other end opening side of the tubular member 40 is fitted to the outer peripheral surface of an igniter collar 51, and thus a flame and the like of the igniter 50 do not flow directly into the second combustion chamber 55.

The igniter collar 51 accommodated in the first combustion chamber 45 is inserted and fixed into the tubular member 40 from a central hole formed in the bottom plate 13a of the closure shell 13. A stepped portion 52 is formed on the collar 51, and the collar 51 is fitted with the stepped portion 52 and the bottom plate 13a overlapping each other.

The second combustion chamber 55 is provided in the external space of the tubular member 40, and a required amount of the second gas generating agent (not illustrated) is accommodated inside the second combustion chamber 55. The second combustion chamber 55 can also include a retainer disposed therein for adjusting volume to appropriate according to a filling amount of the second gas generating agent.

As illustrated in FIGS. 2 and 3A, the cylindrical filter 20 includes a first annular end surface 21, a second annular end surface 22 positioned opposite to the first annular end surface 21 in the axial direction, and a cylindrical wall surface 23 between the first annular end surface 21 and the second annular end surface 22. The cylindrical wall surface 23 includes a cylindrical outer wall surface 23a on the outer side and a cylindrical inner wall surface 23b on the inner side.

A first outer annular wall portion 25 extending in the axial direction along the cylindrical outer wall surface 23a and a first inner annular wall portion 26 extending in the axial direction along the cylindrical inner wall surface 23b are formed on the first annular end surface 21. Thicknesses of the first outer annular wall portion 25 and the first inner annular wall portion 26 are the same, and both are approximately ⅓ of a thickness of the first annular end surface 21.

A first annular groove 27 is formed between the first outer annular wall portion 25 and the first inner annular wall portion 26. The first annular groove 27 is the first annular end surface 21 in which the first outer annular wall portion 25 and the first inner annular wall portion 26 are not formed.

A second outer annular wall portion 28 extending in the axial direction along the cylindrical outer wall surface 23a and a second inner annular wall portion 29 extending in the axial direction along the cylindrical inner wall surface 23b are formed on the second annular end surface 22. Thicknesses of the second outer annular wall portion 28 and the second inner annular wall portion 29 are the same, and both are approximately ⅓ of a thickness of the second annular end surface 22.

A second annular groove 30 is formed between the second outer annular wall portion 28 and the second inner annular wall portion 29. The second annular groove 30 is the second annular end surface 22 in which the second outer annular wall portion 28 and the second inner annular wall portion 29 are not formed.

The first outer annular wall portion 25 and the first inner annular wall portion 26 have the same height from the first annular end surface 21 (first annular groove 27). The height of the first outer annular wall portion 25 and the first inner annular wall portion 26 is preferably equal to a radial thickness of the main body portion of the cylindrical filter 20, and, for example, a ratio of the height of the first outer annular wall portion 25 (or the first inner annular wall portion 26) indicated by a total height (H) of the cylindrical filter 20 is preferably 6 to 18%.

The second outer annular wall portion 28 and the second inner annular wall portion 29 have the same height from the second annular end surface 22 (second annular groove 30). The height of the second outer annular wall portion 28 and the second inner annular wall portion 29 is preferably equal to the radial thickness of the main body portion of the cylindrical filter 20, and, for example, a ratio of the height of the second outer annular wall portion 28 (or the second inner annular wall portion 29) indicated by the total height (H) of the cylindrical filter 20 is preferably 6 to 18%.

Here, the "total height (H) of the cylindrical filter 20" is a distance from the first outer annular wall portion 25 (or the first inner annular wall portion 26) to the second outer annular wall portion 28 (or the second inner annular wall portion 29).

Any one or both of the first outer annular wall portion 25 and the first inner annular wall portion 26 of the cylindrical filter 20 can function as a weakened portion according to a housing shape of the gas generator to be disposed. Similarly, any one or both of the second outer annular wall portion 28 and the second inner annular wall portion 29 of the cylindrical filter 20 can function as a weakened portion.

An embodiment in which the cylindrical filter 20 illustrated in FIGS. 2 and 3A is used in the gas generator 10 illustrated in FIG. 1 will be described with reference to FIG. 3B together with an assembly method for the gas generator 10.

The igniter 50 fixed to the collar 51 is fitted into and fixed to a hole in a central portion of the closure shell 13. Next, the tubular member 40 is fitted into the collar 51. Next, the cylindrical filter 20 is disposed in a predetermined position. At this time, the second outer annular wall portion 28 of the cylindrical filter 20 abuts the inner surface of the lower annular inclined surface 15 of the closure shell 13. Next, a required amount of gas generating agent is accommodated inside the cylindrical filter 20. Next, the diffuser shell 12 is covered from above the cylindrical filter 20 and the tubular member 40. At this time, the first outer annular wall portion 25 of the cylindrical filter 20 abuts the inner surface of the upper annular inclined surface 14 of the diffuser shell 12.

Then, the diffuser shell 12 is pressed down toward the closure shell 13. In this way, the first outer annular wall portion 25 of the cylindrical filter 20 that abuts the upper annular inclined surface 14 of the diffuser shell 12 becomes deformed and thus inclined (bent) inward in the radial direction of the housing 11 due to both of pressing by the upper annular inclined surface 14 and presence of the first annular groove 27 between the first inner annular wall portion 26 and the first outer annular wall portion 25 (that is, presence of a space due to the presence of the first annular groove 27).

The deformation brings about a state where the entire annular outer surface 25a of the first outer annular wall portion 25 abuts the upper annular inclined surface 14, and a tip end portion of the inner surface of the first outer annular wall portion 25 abuts the first inner annular wall portion 26 (FIG. 3B). At this time, the first inner annular wall portion 26 may be deformed and thus crushed in a direction of the bottom plate 13a.

The entire annular outer surface 28a of the second outer annular wall 28 that abuts the inner surface of the lower annular inclined surface 15 of the closure shell 13 becomes deformed and thus inclined (bent) inward in the radial direction of the housing 11 as illustrated in FIG. 3B similarly to the first outer annular wall portion 25, and abuts the lower annular inclined surface 15. At this time, the second inner annular wall portion 29 may also be deformed and thus crushed in a direction of the top plate 12a.

In this way, the first outer annular wall portion 25 of the cylindrical filter 20 and the upper annular inclined surface 14 are in close contact with each other with a large contact area formed by the annular surface, and the second outer annular wall portion 28 of the cylindrical filter 20 and the lower annular inclined surface 15 are in close contact with each other with a large contact area formed by the annular surface, and thus an effect of preventing a short-pass of combustion gas from each of the contact portions is enhanced.

In particular, since the first outer annular wall portion 25 and the second outer annular wall portion 28 are deformed in the radial direction by the respective annular inclined surfaces 14 and 15, the deformation is more likely to occur than when they are compressed in the axial direction and a deformation amount is more easily controlled by the annular inclined surfaces 14 and 15, and the effect of preventing a short-pass of gas from the first and second annular end surfaces of the cylindrical filter is enhanced.

Gas Generator Illustrated in FIGS. 1 and 4

As illustrated in FIG. 4A, a cylindrical filter 20A being another embodiment of the cylindrical filter 20 includes a first annular end surface 121, a second annular end surface 122 positioned opposite to the first annular end surface 121 in the axial direction, and a cylindrical wall surface 123 between the first annular end surface 121 and the second annular end surface 122. The cylindrical wall surface 123 includes a cylindrical outer wall surface 123a on the outer side and a cylindrical inner wall surface 123b on the inner side.

A first outer annular wall portion 125 extending in the axial direction along the cylindrical outer wall surface 123a is formed on the outer side in the radial direction of the first annular end surface 121. A thickness of the first outer annular wall portion 125 is approximately ⅓ of a thickness of the first annular end surface 121.

Furthermore, a first inner annular stepped surface 126 is formed on the first annular end surface 121 by an inner diameter difference between the first annular end surface 121 and the first outer annular wall portion 125.

A second outer annular wall portion 128 extending in the axial direction along the cylindrical outer wall surface 123a is formed on the outer side in the radial direction of the second annular end surface 122. A thickness of the second outer annular wall portion 128 is approximately ⅓ of a thickness of the second annular end surface 122.

Furthermore, a second inner annular stepped surface 129 is formed on the second annular end surface 122 by an inner diameter difference between the second annular end surface 122 and the second outer annular wall portion 128.

A height of the first outer annular wall portion 125 is preferably equal to a radial thickness of a main body portion of the cylindrical filter 20A. For example, a ratio of the height of the first outer annular wall portion 125 to a total height (H) of the cylindrical filter 20A is preferably 6 to 18%.

A height of the second outer annular wall portion 128 is preferably equal to the radial thickness of the main body portion of the cylindrical filter 20A. For example, a ratio of the height of the second outer annular wall portion 128 to the total height (H) of the cylindrical filter 20A is preferably 6 to 18%.

Here, the "total height (H) of the cylindrical filter 20A" is a distance from the first outer annular wall portion 125 to the second outer annular wall portion 128.

An embodiment in which the cylindrical filter 20A illustrated in FIG. 4A is used in the gas generator 10 illustrated in FIG. 1 will be described with reference to FIG. 4B together with an assembly method for the gas generator 10.

The igniter 50 fixed to the collar 51 is fitted into and fixed to the hole in the central portion of the closure shell 13. Next, the tubular member 40 is fitted into the collar 51. Next, the cylindrical filter 20A is disposed in a predetermined position. At this time, the second outer annular wall portion 128 of the cylindrical filter 20A abuts the inner surface of the lower annular inclined surface 15 of the closure shell 13. Next, a required amount of gas generating agent is accommodated inside the cylindrical filter 20A. Next, the diffuser shell 12 is covered from above the cylindrical filter 20A and the tubular member 40. At this time, the first outer annular wall portion 125 of the cylindrical filter 20A abuts the inner surface of the upper annular inclined surface 14 of the diffuser shell 12.

Then, the diffuser shell 12 is pressed down toward the closure shell 13. In this way, the first outer annular wall portion 125 of the cylindrical filter 20A that abuts the upper annular inclined surface 14 of the diffuser shell 12 becomes deformed and thus inclined (bent) inward in the radial direction of the housing 11 due to both of pressing by the upper annular inclined surface 14 and presence of a space inward in the radial direction due to the first inner annular stepped surface 126. The deformation brings about a state where the entire annular outer surface 125a of the first outer annular wall portion 125 is in close contact with the inner surface of the upper annular inclined surface 14 (FIG. 4B).

The entire annular outer surface 128a of the second outer annular wall portion 128 that abuts the inner surface of the lower annular inclined surface 15 of the closure shell 13 becomes deformed and thus inclined (bent) inward in the radial direction of the housing 11 as illustrated in FIG. 4B similarly to the first outer annular wall portion 125, and abuts the lower annular inclined surface 15. The deformation brings about a state where the annular outer surface 128a of the second outer annular wall portion 128 is in close contact with the inner surface of the lower annular inclined surface 15.

In this way, the first outer annular wall portion 125 of the cylindrical filter 20A and the upper annular inclined surface 14 are in close contact with each other with a large contact area formed by the annular surface, and the second outer annular wall portion 128 of the cylindrical filter 20A and the lower annular inclined surface 15 are in close contact with each other with a large contact area formed by the annular surface, and thus an effect of preventing a short-pass of combustion gas from each of the contact portions is enhanced. An effect similar to that of the example in FIGS. 2 and 3 is acquired.

Gas Generator Illustrated in FIGS. 1 and 5

Figure 5A:
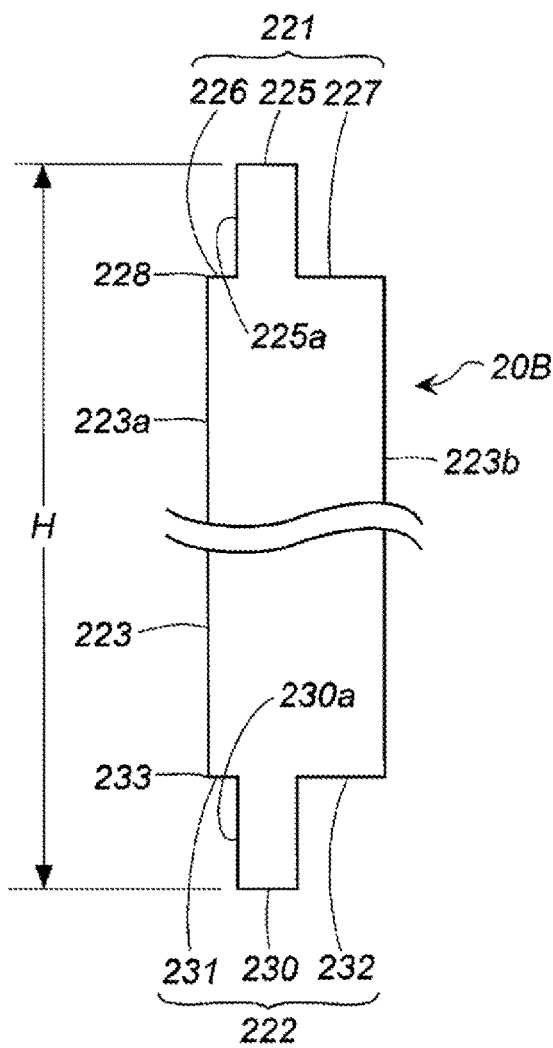
FIG. 5A is a partial cross-sectional view in the axial direction of the cylindrical filter different from that illustrated in FIG. 2.

As illustrated in FIG. 5A, a cylindrical filter 20B being another embodiment of the cylindrical filter 20 includes a first annular end surface 221, a second annular end surface 222 positioned opposite to the first annular end surface 221 in the axial direction, and a cylindrical wall surface 223 between the first annular end surface 221 and the second annular end surface 222. The cylindrical wall surface 223 includes a cylindrical outer wall surface 223a on the outer side and a cylindrical inner wall surface 223b on the inner side.

A first intermediate annular wall portion 225 is formed by being extended in the axial direction at an interval in the thickness direction from the cylindrical outer wall surface 223a of the first annular end surface 221. A thickness of the first intermediate annular wall portion 225 is approximately ⅓ of a thickness of the first annular end surface 221.

Furthermore, a first outer annular stepped surface 226 is formed on the first annular end surface 221 by an outer diameter difference between the first annular end surface 221 and the first intermediate annular wall portion 225, and a first inner annular stepped surface 227 is formed on the first annular end surface 221 by an inner diameter difference between the first annular end surface 221 and the first intermediate annular wall portion 225.

In the embodiment illustrated in FIG. 5A, the first intermediate annular wall portion 225, the first outer annular stepped surface 226, and a first outer annular corner portion 228 being a boundary portion between the first outer annular stepped surface 226 and the cylindrical outer wall surface 223a function as a weakened portion.

Figure 5C:
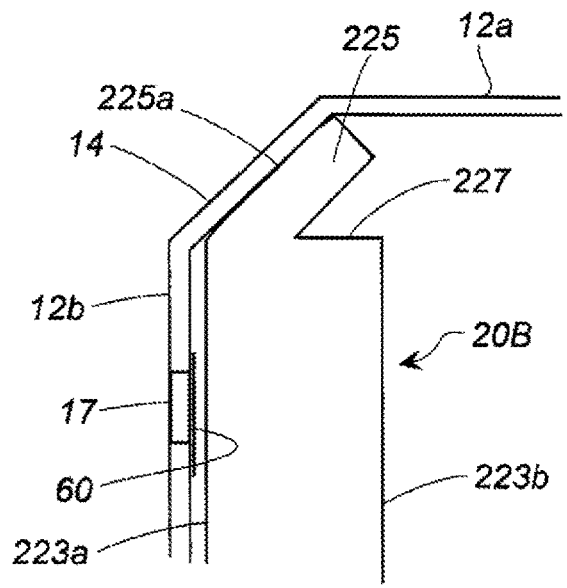
FIG. 5C is a partial cross-sectional view in the axial direction illustrating a state of deformation of a weakened portion corresponding to FIG. 3B.
Figure 5B:
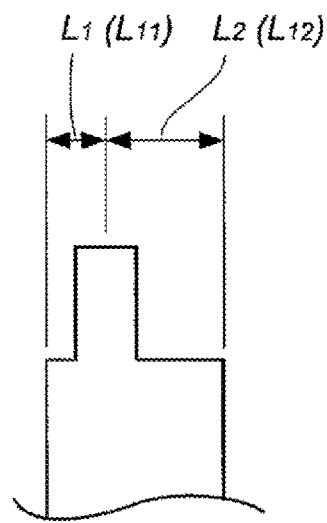
FIG. 5B is a partial cross-sectional view illustrating a relationship between distances L1 (L11) and L2 (L12)

A distance (L1) from an intermediate position of the thickness of the first intermediate annular wall portion 225 to the cylindrical outer wall surface 223a and a distance (L2) from the intermediate position of the thickness of the first intermediate annular wall portion 225 to the cylindrical inner wall surface 223b satisfy a relationship of L1<L2 (FIG. 5B). L2/L1 is preferably in a range from 1.5 to 3.

A second intermediate annular wall portion 230 is formed by being extended in the axial direction at an interval in the thickness direction from the cylindrical outer wall surface 223a of the second annular end surface 222. A thickness of the second intermediate annular wall portion 230 is approximately ⅓ of a thickness of the second annular end surface 222.

Furthermore, a second outer annular stepped surface 231 is formed on the second annular end surface 222 by an outer diameter difference between the second annular end surface 222 and the second intermediate annular wall portion 230, and a second inner annular stepped surface 232 is formed on the second annular end surface 222 by an inner diameter difference between the second annular end surface 222 and the second intermediate annular wall portion 230.

In the embodiment illustrated in FIG. 5A, the second intermediate annular wall portion 230, the second outer annular stepped surface 231, and a second outer annular corner portion 233 being a boundary portion between the second outer annular stepped surface 231 and the cylindrical outer wall surface 223a function as a weakened portion.

A distance (L11) from an intermediate position of the thickness of the second intermediate annular wall portion 230 to the cylindrical outer wall surface 223a and a distance (L12) from the intermediate position of the thickness of the second intermediate annular wall portion 230 to the cylindrical inner wall surface 223b satisfy a relationship of L11<L12 (FIG. 5B). L12/L11 is preferably in a range from 1.5 to 3.

A height of the first intermediate annular wall portion 225 is preferably equal to a radial thickness of a main body portion of the cylindrical filter 20B. For example, a ratio of the height of the first intermediate annular wall portion 225 to a total height (H) of the cylindrical filter 20B is 6 to 18%.

A height of the second intermediate annular wall portion 230 is preferably equal to the radial thickness of the main body portion of the cylindrical filter 20B. For example, a ratio of the height of the second intermediate annular wall portion 230 to the total height (H) of the cylindrical filter 20B is 6 to 18%.

Here, the "total height (H) of the cylindrical filter 20B" is a distance from the first intermediate annular wall portion 225 to the second intermediate annular wall portion 230.

An embodiment in which the cylindrical filter 20B illustrated in FIG. 5A is used in the gas generator 10 illustrated in FIG. 1 will be described with reference to FIG. 5C together with an assembly method for the gas generator 10.

The igniter 50 fixed to the collar 51 is fitted into and fixed to the hole in the central portion of the closure shell 13. Next, the tubular member 40 is fitted into the collar 51. Next, the cylindrical filter 20B is disposed in a predetermined position. At this time, the second intermediate annular wall portion 230 of the cylindrical filter 20B abuts the inner surface of the lower annular inclined surface 15 of the closure shell 13. Next, a required amount of gas generating agent is accommodated inside the cylindrical filter 20B. Next, the diffuser shell 12 is covered from above the cylindrical filter 20B and the tubular member 40. At this time, the first intermediate annular wall portion 225 of the cylindrical filter 20B abuts the inner surface of the upper annular inclined surface 14 of the diffuser shell 12.

Then, the diffuser shell 12 is pressed down toward the closure shell 13. In this way, the first intermediate annular wall portion 225 of the cylindrical filter 20B that abuts the upper annular inclined surface 14 of the diffuser shell 12 becomes deformed and thus inclined (bent) inward in the radial direction of the housing 11 due to both of pressing by the upper annular inclined surface 14 and presence of a space inward in the radial direction due to the first inner annular stepped surface 227. At this time, the first outer annular corner portion 228 and the first outer annular stepped surface 226 are also crushed and deformed inward in the radial direction. The deformation brings about a state where an outer surface 225a of the first intermediate annular wall portion 225, the crushed first outer annular corner portion 228, and the crushed first outer annular stepped surface 226 are as an annular surface in close contact with the upper annular inclined surface 14.

The second intermediate annular wall portion 230 that abuts the inner surface of the lower annular inclined surface 15 of the closure shell 13 becomes deformed and thus inclined (bent) inward in the radial direction of the housing 11 due to both of pressing by the lower annular inclined surface 15 and presence of a space inward in the radial direction due to the second inner annular stepped surface 232. At this time, the second outer annular corner portion 233 and the second outer annular stepped surface 231 are also crushed and deformed inward in the radial direction. The deformation brings about a state where an outer surface 230a of the second intermediate annular wall portion 230, the crushed second outer annular corner portion 233, and the crushed second outer annular stepped surface 231 are in close contact with the lower annular inclined surface 15 similarly to FIG. 5C.

In this way, the annular outer surface 225a of the first intermediate annular wall portion 225 of the cylindrical filter 20B, the crushed first outer annular corner portion 228, and the crushed first outer annular stepped surface 226 are brought into a state of close contact with the upper annular inclined surface 14 with a large contact area formed by an annular surface, and the annular outer surface 230a of the second intermediate annular wall portion 230 of the cylindrical filter 20B, the crushed second outer annular corner portion 233, and the crushed second outer annular stepped surface 231 are brought into a state of close contact, as an annular surface, with the lower annular inclined surface 15. As a result, the effect of preventing a short-pass of combustion gas from the closely contacting portion is enhanced.

Figure 6:
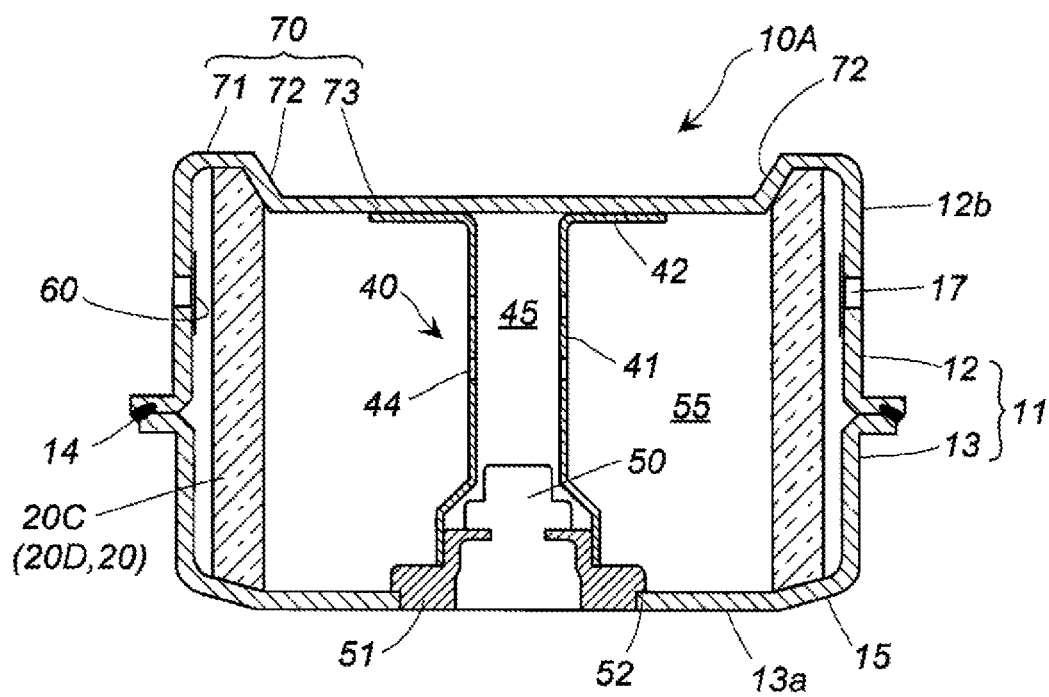
FIG. 6 is a cross-sectional view in the axis direction of a gas generator according to another embodiment of the present invention.

Gas Generator Illustrated in FIG. 6

A gas generator 10A illustrated in FIG. 6 is the same as the gas generator 10 in FIG. 1 except for a shape of a top plate 70 of the housing 11.

The top plate 70 is formed of an outer annular top plate portion 71, an inner circular top plate portion 73, and an intermediate annular inclined top plate portion 72 between the outer annular top plate portion 71 and the inner circular top plate portion 73.

The intermediate annular inclined top plate portion 72 is inclined and thus a distance between the top plate 70 and the bottom plate 13a decreases from outward in the radial direction to inward in the radial direction. The inclination direction of the intermediate annular inclined top plate portion 72 is opposite to the inclination direction of the upper annular inclined surface 14 illustrated in FIG. 1.

Figures 7A, 7B:
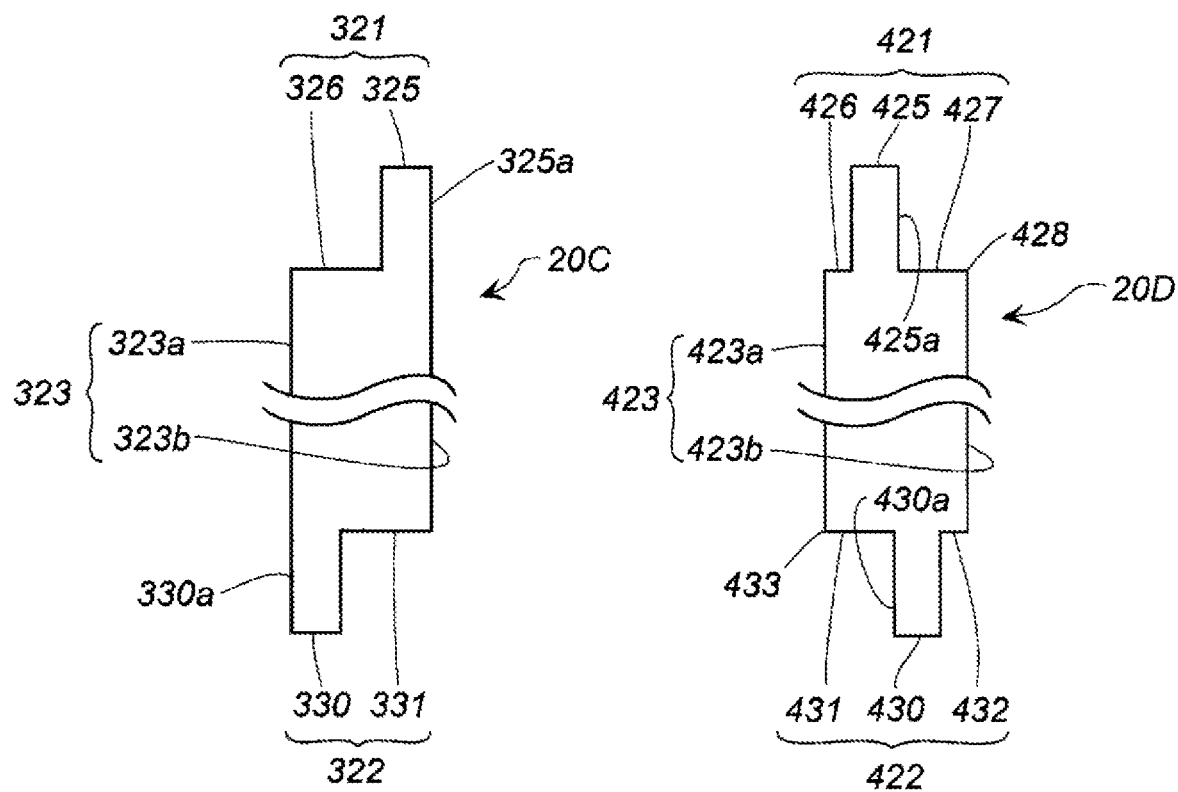
FIG. 7A is a partial cross-sectional view in the axial direction of the cylindrical filter used in the gas generator in FIG. 6.
FIG. 7B is a partial cross- sectional view in the axial direction of the cylindrical filter according to another embodiment from FIG. 7A.

In the gas generator 10A illustrated in FIG. 6, any of the cylindrical filter 20 illustrated in FIG. 3, the cylindrical filter 20C illustrated in FIG. 7A, and the cylindrical filter 20D illustrated in FIG. 7B is used.

Gas Generator Illustrated in FIG. 6 Using Cylindrical Filter Illustrated in FIG. 3A An embodiment in which the cylindrical filter 20 illustrated in FIG. 3A is used in the gas generator 10A illustrated in FIG. 6 will be described together with an assembly method for the gas generator 10A.

The igniter 50 fixed to the collar 51 is fitted into and fixed to the hole in the central portion of the closure shell 13. Next, the tubular member 40 is fitted into the collar 51. Next, the cylindrical filter 20 is disposed in a predetermined position. At this time, the second outer annular wall portion 28 of the cylindrical filter 20 abuts the inner surface of the lower annular inclined surface 15 of the closure shell 13. Next, a required amount of gas generating agent is accommodated inside the cylindrical filter 20. Next, the diffuser shell 12 is covered from above the cylindrical filter 20 and the tubular member 40. At this time, the first inner annular wall portion 26 of the cylindrical filter 20 abuts the inner surface of the intermediate annular inclined top plate portion 72 of the diffuser shell 12.

Then, the diffuser shell 12 is pressed down toward the closure shell 13. In this way, the first inner annular wall portion 26 of the cylindrical filter 20 that abuts the intermediate annular inclined top plate portion 72 of the diffuser shell 12 becomes deformed and thus inclined (bent) outward in the radial direction of the housing 11 due to both of pressing by the intermediate annular inclined top plate portion 72 and presence of the first annular groove 27 between the first outer annular wall portion 25 and the first inner annular wall portion 26 (that is, presence of a space due to the presence of the first annular groove 27). The deformation brings about a state where a radially inner surface (annular inner surface) 26a of the first inner annular wall portion 26 is in close contact with the intermediate annular inclined top plate portion 72, and a tip end portion of the first inner side annular wall portion 26 abuts the first outer annular wall portion 25. At this time, the first outer annular wall portion 25 may be deformed and thus crushed in the direction of the bottom plate 13a.

The second outer annular wall portion 28 that abuts the inner surface of the lower annular inclined surface 15 of the closure shell 13 becomes deformed and thus inclined (bent) inward in the radial direction of the housing 11 similarly to the embodiment illustrated in FIG. 3B. The deformation brings about a state where the radially outer surface (annular outer surface) 28a of the second outer annular wall portion 28 is in close contact with the lower annular inclined surface 15, and a tip end portion of the second outer annular wall portion 28 abuts the second inner annular wall portion 29. At this time, the second inner annular wall portion 29 may also be deformed and thus crushed in the direction of the bottom plate 13a.

In this way, the first inner annular wall portion 26 of the cylindrical filter 20 and the intermediate annular inclined top plate portion 72 are in close contact with each other with a large contact area formed by the annular surface, and the second outer annular wall portion 28 of the cylindrical filter 20 and the lower annular inclined surface 15 are in close contact with each other with a large contact area formed by the annular surface, and thus an effect of preventing a short-pass of combustion gas from each of the contact portions is enhanced.

Gas Generator Illustrated in FIG. 6 Using Cylindrical Filter Illustrated in FIG. 7A An embodiment in which a cylindrical filter 20C illustrated in FIG. 7A is used in the gas generator 10A illustrated in FIG. 6 will be described together with an assembly method for the gas generator 10A.

The cylindrical filter 20C illustrated in FIG. 7A will be described.

As illustrated in FIG. 7, the cylindrical filter 20C includes a first annular end surface 321, a second annular end surface 322 positioned opposite to the first annular end surface 321 in the axial direction, and a cylindrical wall surface 323 between the first annular end surface 321 and the second annular end surface 322. The cylindrical wall surface 323 includes a cylindrical outer wall surface 323a on the outer side and a cylindrical inner wall surface 323b on the inner side.

A first inner annular wall portion 325 extending in the axial direction along the cylindrical inner wall surface 323b is formed on the inner side in the radial direction of the first annular end surface 321. A thickness of the first inner annular wall portion 325 is approximately ⅓ of a thickness of the first annular end surface 321. Furthermore, a first outer annular stepped surface 326 is formed on the first annular end surface 321 by an inner diameter difference between the first annular end surface 321 and the first inner annular wall portion 325.

A second outer annular wall portion 330 extending in the axial direction along the cylindrical outer wall surface 323a is formed on the outer side in the radial direction of the second annular end surface 322. A thickness of the second outer annular wall portion 330 is approximately ⅓ of a thickness of the second annular end surface 322. Furthermore, a second inner annular stepped surface 331 is formed on the second annular end surface 322 by an inner diameter difference between the second annular end surface 322 and the second outer annular wall portion 330.

A height of the first inner annular wall portion 325 is preferably equal to a radial thickness of a main body portion of the cylindrical filter 20C. For example, a ratio of the height of the first inner annular wall portion 325 to a total height of the cylindrical filter 20C is preferably 6 to 18%.

A height of the second inner annular wall portion 330 is preferably equal to the radial thickness of the main body portion of the cylindrical filter 20C. For example, a ratio of the height of the second inner annular wall portion 330 to the total height of the cylindrical filter 20C is preferably 6 to 18%.

Here, the "total height of the cylindrical filter 20C" is a distance from the first inner annular wall portion 325 to the second inner annular wall portion 330, and is substantially the same distance as H in FIG. 4A.

The embodiment in which the cylindrical filter 20C illustrated in FIG. 7A is used in the gas generator 10A illustrated in FIG. 6 will be described with reference to FIGS. 6 and 7 together with the assembly method for the gas generator 10A.

The igniter 50 fixed to the collar 51 is fitted into and fixed to the hole in the central portion of the closure shell 13. Next, the tubular member 40 is fitted into the collar 51. Next, the cylindrical filter 20C is disposed in a predetermined position. At this time, the second outer annular wall portion 330 of the cylindrical filter 20C abuts the inner surface of the lower annular inclined surface 15 of the closure shell 13. Next, a required amount of gas generating agent is accommodated inside the cylindrical filter 20C. Next, the diffuser shell 12 is covered from above the cylindrical filter 20C and the tubular member 40. At this time, the first inner annular wall portion 325 of the cylindrical filter 20C abuts the inner surface of the intermediate annular inclined top plate portion 72 of the diffuser shell 12.

Then, the diffuser shell 12 is pressed down toward the closure shell 13. In this way, the first inner annular wall portion 325 of the cylindrical filter 20 that abuts the intermediate annular inclined top plate portion 72 of the diffuser shell 12 becomes deformed and thus inclined (bent) outward in the radial direction of the housing 11 due to both of pressing by the intermediate annular inclined top plate portion 72 and presence of a space between the first outer annular stepped surface 326 and the first inner annular wall portion 325. The deformation brings about a state where the annular inner side surface 325a of the first inner annular wall portion 325 is in close contact with the inner surface of the intermediate annular inclined top plate portion 72.

The second outer annular wall 330 that abuts the inner surface of the lower annular inclined surface 15 of the closure shell 13 becomes deformed and thus inclined (bent) inward in the radial direction of the housing 11 as illustrated in FIG. 4B. The deformation brings about a state where the annular outer surface 330a of the second outer annular wall portion 330 is in close contact with the inner surface of the lower annular inclined surface 15.

In this way, the first inner annular wall portion 325 of the cylindrical filter 20C and the intermediate annular inclined top plate portion 72 are in close contact with each other with a large contact area formed by the annular surface, and the second outer annular wall portion 330 of the cylindrical filter 20C and the lower annular inclined surface 15 are in close contact with each other with a large contact area formed by the annular surface, and thus an effect of preventing a short-pass of combustion gas from each of the contact portions is enhanced.

Gas Generator Illustrated in FIG. 6 Using Cylindrical Filter Illustrated in FIG. 7B An embodiment in which a cylindrical filter 20D illustrated in FIG. 7B is used in the gas generator 10A illustrated in FIG. 6 will be described together with an assembly method for the gas generator 10A.

The cylindrical filter 20D illustrated in FIG. 7B will be described.

As illustrated in FIG. 7B, the cylindrical filter 20D includes a first annular end surface 421, a second annular end surface 422 positioned opposite to the first annular end surface 421 in the axial direction, and a cylindrical wall surface 423 between the first annular end surface 421 and the second annular end surface 422. The cylindrical wall surface 423 includes a cylindrical outer wall surface 423a on the outer side and a cylindrical inner wall surface 423b on the inner side.

A first intermediate annular wall portion 425 is formed by being extended in the axial direction at an interval in the thickness direction from the cylindrical inner wall surface 423b of the first annular end surface 421. A thickness of the first intermediate annular wall portion 425 is approximately ⅓ of a thickness of the first annular end surface 421. Furthermore, a first outer annular stepped surface 426 is formed on the first annular end surface 421 by an outer diameter difference between the first annular end surface 421 and the first intermediate annular wall portion 425, and a first inner annular stepped surface 427 is formed on the first annular end surface 421 by an inner diameter difference between the first annular end surface 421 and the first intermediate annular wall portion 425.

The first intermediate annular wall portion 425, the first inner annular stepped surface 427, and a first inner annular corner portion 428 being a boundary portion between the first inner annular stepped surface 427 and the cylindrical inner wall surface 423b function as a weakened portion.

A distance (L21) from an intermediate position of the thickness of the first intermediate annular wall portion 425 to the cylindrical outer wall surface 423a and a distance (L22) from the intermediate position of the thickness of the first intermediate annular wall portion 425 to the cylindrical inner wall surface 423b satisfy a relationship of L21<L22. L22/L21 is preferably in a range from 2 to 4. L21 corresponds to L1 and L11 in FIG. 5B, and L22 corresponds to L2 and L12 in FIG. 5B.

A second intermediate annular wall portion 430 is formed by being extended in the axial direction at an interval in the thickness direction from the cylindrical outer wall surface 423a of the second annular end surface 422. A thickness of the second intermediate annular wall portion 430 is approximately ⅓ of a thickness of the second annular end surface 422.

Furthermore, a second outer annular stepped surface 431 is formed on the second annular end surface 422 by an outer diameter difference between the second annular end surface 422 and the second intermediate annular wall portion 430, and a second inner annular stepped surface 432 is formed on the second annular end surface 422 by an inner diameter difference between the second annular end surface 422 and the second intermediate annular wall portion 430.

In the embodiment illustrated in FIG. 7A, the second intermediate annular wall portion 430, the second outer annular stepped surface 431, and a second outer annular corner portion 433 being a boundary portion between the second outer annular stepped surface 431 and the cylindrical outer wall surface 423*a* function as a weakened portion.

A distance (L31) from an intermediate position of the thickness of the second intermediate annular wall portion 430 to the cylindrical outer wall surface 423*a* and a distance (L32) from the intermediate position of the thickness of the second intermediate annular wall portion 430 to the cylindrical inner wall surface 423*b* satisfy a relationship of L31>L32. L31/L32 is preferably in a range from 2 to 4. L31 corresponds to L2 and L12 in FIG. 5B, and L32 corresponds to L1 and L11 in FIG. 5B.

A height of the first intermediate annular wall portion 425 is preferably equal to a radial thickness of a main body portion of the cylindrical filter 20D. For example, a ratio of the height of the first intermediate annular wall portion 425 in a total height (H) of the cylindrical filter 20D is 6 to 18%.

A height of the second intermediate annular wall portion 430 is preferably equal to the radial thickness of the main body portion of the cylindrical filter 20D. For example, a ratio of the height of the second intermediate annular wall portion 430 in the total height (H) of the cylindrical filter 20D is 6 to 18%.

Here, the "total height (H) of the cylindrical filter 20D" is a distance from the first intermediate annular wall portion 425 to the second intermediate annular wall portion 430. H described above corresponds to H in FIG. 5A.

The embodiment in which the cylindrical filter 20D illustrated in FIG. 7B is used in the gas generator 10A illustrated in FIG. 6 will be described with reference to FIGS. 6 and 7 together with the assembly method for the gas generator 10A.

The igniter 50 fixed to the collar 51 is fitted into and fixed to the hole in the central portion of the closure shell 13. Next, the tubular member 40 is fitted into the collar 51. Next, the cylindrical filter 20D is disposed in a predetermined position. At this time, the second intermediate annular wall portion 430 of the cylindrical filter 20D abuts the inner surface of the lower annular inclined surface 15 of the closure shell 13. Next, a required amount of gas generating agent is accommodated inside the cylindrical filter 20D. Next, the diffuser shell 12 is covered from above the cylindrical filter 20D and the tubular member 40.

At this time, the first intermediate annular wall portion 425 of the cylindrical filter 20D abuts the inner surface of the intermediate annular inclined top plate portion 72 of the diffuser shell 12.

Then, the diffuser shell 12 is pressed down toward the closure shell 13. In this way, the first intermediate annular wall portion 425 of the cylindrical filter 20D that abuts the intermediate annular inclined top plate portion 72 of the diffuser shell 12 becomes deformed and thus inclined (bent) outward in the radial direction of the housing 11 due to both of pressing by the intermediate annular inclined top plate portion 72 and presence of a space outward in the radial direction due to the first outer annular stepped surface 426. At this time, the first inner annular corner portion 428 and the first inner annular stepped surface 427 are also crushed and deformed inward in the radial direction. The deformation brings about a state where an annular inner surface 425*a* of the first intermediate annular wall portion 425, the crushed first outer annular corner portion 428, and the crushed first inner annular stepped surface 427 are as an annular surface in close contact with the intermediate annular inclined top plate portion 72.

The second intermediate annular wall portion 430 that abuts the inner surface of the lower annular inclined surface 15 of the closure shell 13 becomes deformed and thus inclined (bent) inward in the radial direction of the housing 11 due to both of pressing by the lower annular inclined surface 15 and presence of a space due to the second inner annular stepped surface 432. At this time, the second outer annular corner portion 433 and the second outer annular stepped surface 431 are also crushed and deformed inward in the radial direction. The deformation brings about a state where the annular outer surface 430*a* of the second intermediate annular wall portion 430, the crushed second outer annular corner portion 433, and the crushed second outer annular stepped surface 431 are in close contact with the lower annular inclined surface 15 in a deformation state similar to that of FIG. 5C.

In this way, the annular inner surface 425*a* of the first intermediate annular wall portion 425 of the cylindrical filter 20D, the crushed first inner annular corner portion 428, and the crushed first inner annular stepped surface 427 are brought into a state of close contact with the intermediate annular inclined top plate portion 72 with a large contact area formed by an annular surface, and the annular outer surface 430*a* of the second intermediate annular wall portion 430 of the cylindrical filter 20D, the crushed second outer annular corner portion 433, and the crushed second outer annular stepped surface 431 are brought into a state of close contact with the lower annular inclined surface 15 with a large contact area formed by an annular surface. As a result, the effect of preventing a short-pass of combustion gas from the closely contacting portion is enhanced.

Manufacturing Method for Cylindrical Filter

A manufacturing method for a cylindrical filter will be described with reference to FIGS. 8A to 8C.

The cylindrical filter according to an embodiment of the present invention can be manufactured by winding an elongated filter material having a partially increased/decreased width, and welding and fixing a winding start and a winding end. The elongated filter material may have a uniform thickness or may have a partially different thickness.

Figure 8A:
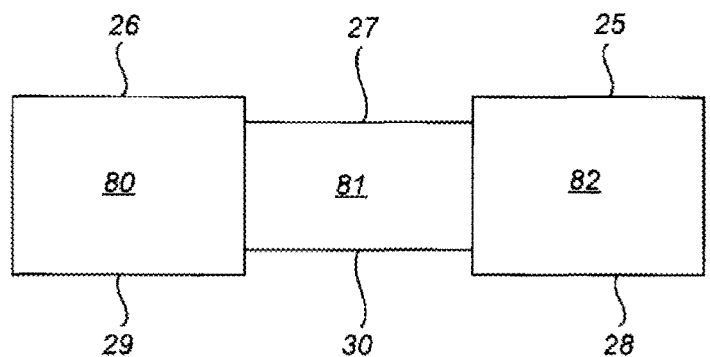
FIGS. 8A to 8C are schematic diagrams for explaining a manufacturing method for a cylindrical filter.

FIG. 8A illustrates a manufacturing method for the cylindrical filter 20 illustrated in FIG. 3A.

Filter materials are wound, with a filter material 80 becoming an innermost layer, a filter material 81 becoming an intermediate layer, and a filter material 82 becoming an outermost layer. Note that a length ratio of the filter materials 80 to 82 does not indicate a length ratio used in actual manufacturing.

The first inner annular wall portion 26, the first annular groove 27, and the first outer annular wall portion 25 are located in order on a first end side (upper side in the drawing) of the filter material 80 to the filter material 82 in the width direction, and the second inner annular wall portion 29, the second annular groove 30, and the second outer annular wall portion 28 are located in order on a second end side (lower side in the drawing) of the filter material 80 to the filter material 82 in the width direction.

Figure 8B:
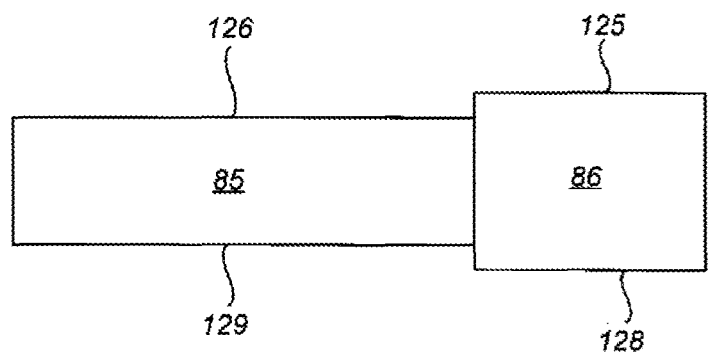

FIG. 8B illustrates a manufacturing method for the cylindrical filter 20A illustrated in FIG. 4A.

Filter materials are wound, with a filter material 85 becoming an innermost layer and an intermediate layer, and a filter material 86 becoming an outermost layer. Note that a length ratio of the filter materials 85 and 86 does not indicate a length ratio used in actual manufacturing.

The first inner annular stepped surface 126 and the first outer annular wall portion 125 are located in order on a first end side (upper side in the drawing) of the filter material 85 to the filter material 86 in the width direction, and the second inner annular stepped surface 129 and the second outer annular wall portion 128 are located in order on a second end side (lower side in the drawing) of the filter material 85 to the filter material 86 in the width direction.

Figure 8C:
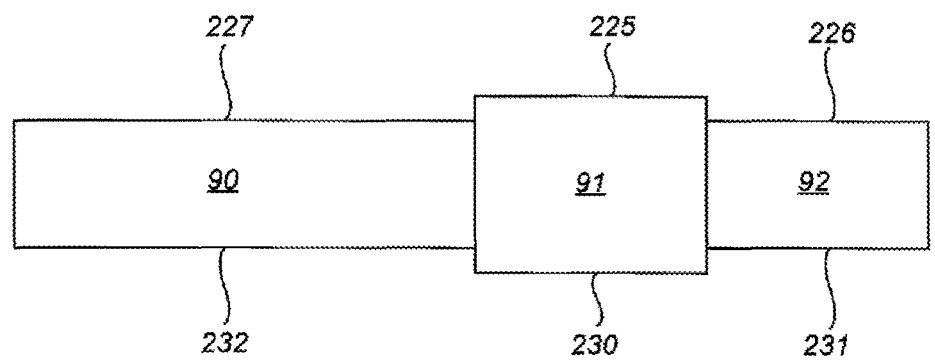

FIG. 8C illustrates a manufacturing method for the cylindrical filter 20B illustrated in FIG. 5A.

Filter materials are wound, with a filter material 90 winding on an innermost layer side, a filter material 91 becoming an intermediate layer, and a filter material 92 becoming an outermost layer. Note that a length ratio of the filter materials 90 to 92 does not indicate a length ratio used in actual manufacturing.

The first inner annular stepped surface 227, the first intermediate annular wall portion 225, and the first outer annular stepped surface 226 are located in order on a first end side (upper side in the drawing) of the filter material 90 to the filter material 92 in the width direction, and the second inner annular stepped surface 232, the second intermediate annular wall portion 230, and the second outer annular stepped surface 231 are located in order on a second end side (the lower side in the drawing) of the filter material 90 to the filter material 92 in the width direction.

The cylindrical filters 20C and 20D illustrated in FIGS. 7A and 7B can also be manufactured by adjusting a width and a thickness of a filter material according to the manufacturing method described above.

The airbag device according to an embodiment of the present invention incorporates the gas generator illustrated in FIGS. 1 and 6 into a known airbag device. Specifically, the airbag device includes a gas generator, an impact sensor that senses an impact and actuates the gas generator, an airbag that is introduced with gas generated by the gas generator and inflates, and a module case that accommodates the airbag.

Next, an operation when the gas generator according to an embodiment of the present invention is incorporated into an airbag device of an automobile will be described with reference to FIG. 1.

When the automobile collides, an instruction is received from the impact sensor, the igniter 50 actuates, the first gas generating agent in the first combustion chamber 45 is ignited and burned, and a flame and high-temperature gas are generated. The flame and the high-temperature gas are injected into the second combustion chamber 55 from the plurality of communication holes 44 (the sealing tape blocking the communication holes 44 is ruptured) provided in the tubular member 40, igniting and burning the second gas generating agent, and generating gas serving as an airbag inflation medium.

At this time, in the gas generator 10 illustrated in FIG. 1, the first annular end surface 21 of the cylindrical filter 20 and the upper annular inclined surface 14 are in close contact with each other, and the second annular end surface 22 of the cylindrical filter 20 and the lower annular inclined surface 15 are in close contact with each other. Thus, an effect of preventing a short-pass of the generated gas from the contact portion between the cylindrical filter 20 and the housing 11 is sufficiently exhibited.

Since such an effect of preventing a short-pass is exhibited, the generated gas is filtered and cooled by the cylindrical filter 20, and then breaks the sealing tape 60 and is discharged from the gas discharge port 17, and inflates the airbag.

The present invention has been described as above. Of course, the present invention includes various forms of modifications within the scope thereof, and these modifications do not depart from the scope of the invention. All of what a person with ordinary skill in the art will clearly consider as a variation of the present invention is within the scope of the claims set forth below.

The invention claimed is:

1. A gas generator comprising:
a housing including a top plate, a circumferential wall, a bottom plate, an upper annular inclined surface extending between the top plate and the circumferential wall, and a lower annular inclined surface extending between the bottom plate and the circumferential wall;
a cylindrical filter for a gas generating agent or pressurized gas as a gas generation source, the cylindrical filter being provided inside the housing, the cylindrical filter including,
a first annular end surface;
a second annular end surface positioned opposite to the first annular end surface in an axial direction;
a cylindrical wall surface extending between the first annular end surface and the second annular end surface, and
a weakened portion, integrally formed with a remaining part of the cylindrical filter, and extending from at least one of the first annular end surface and the second annular end surface, wherein
when the first annular end surface includes the weakened portion, the weakened portion includes a first annular wall portion that protrudes from the first annular end surface and has a thickness less than a thickness of the first annular end surface, the weakened portion is provided such that the weakened portion is bent inward in a radial direction of the housing and an outer peripheral surface of the weakened portion is in contact only with the upper annular inclined surface of the housing and an inner peripheral surface of the weakened portion and a remaining portion of the first annular end surface define a space, and
when the second annular end surface includes the weakened portion, the weakened portion includes a second annular wall portion that protrudes from the second annular end surface and has a thickness less than a thickness of the second annular end surface, the weakened portion is provided such that the weakened portion is bent inward in the radial direction of the housing and an outer peripheral surface of the weakened portion is in cylindrical contact only with the lower annular inclined surface of the housing and an inner peripheral surface of the weakened portion and a remaining portion of the second annular end surface define a space.

2. The gas generator according to claim 1, wherein, when the first annular end surface includes the weakened portion including the first annular wall portion,
the weakened portion is one selected from a first outer annular wall portion having an annular outer surface extending continuously from a cylindrical outer wall surface of the cylindrical filter, a first inner annular wall portion having an annular inner surface extending continuously from a cylindrical inner wall surface of the cylindrical filter, and a combination of the first outer annular wall portion and the first inner annular wall portion, and a thickness of each of the first outer annular wall portion and the first inner annular wall portion is less than ½ of a thickness of the first annular end surface, and, when the second annular end surface includes the weakened portion including the second annular wall portion, the weakened portion is one selected from a second outer annular wall portion having an annular inner surface extending continuously from the cylindrical outer wall surface of the cylindrical filter, a second inner annular wall portion having an annular inner surface extending continuously from the cylindrical inner wall surface of the cylindrical filter, and a combination of the second outer annular wall portion and the second inner annular wall portion, and a thickness of each of the second outer annular wall portion and the second inner annular wall portion is less than ½ of a thickness of the second annular end surface.

3. The gas generator according to claim 1, wherein, when the first annular end surface includes the weakened portion including a first annular wall portion, the weakened portion includes
   a first intermediate annular wall portion extending from an interval in a thickness direction from a cylindrical outer wall surface of the cylindrical filter, and
   a range from the first intermediate annular wall portion to a first outer corner portion that is a boundary portion between the first annular end surface and the cylindrical outer wall surface or a range from the first intermediate annular wall portion to a first inner corner portion that is a boundary portion between the first annular end surface and a cylindrical inner wall surface, and
a thickness of the first intermediate annular wall portion has a thickness equal to or less than ½ of a thickness of the first annular end surface, and a distance (L1) from an intermediate position of a thickness of the first intermediate annular wall portion to the cylindrical outer wall surface and a distance (L2) from the intermediate position of the thickness of the first intermediate annular wall portion to the cylindrical inner wall surface satisfy a relationship of L1<L2, L1=L2, or L1>L2, and, when the second annular end surface includes the weakened portion including a second annular wall portion, the weakened portion includes
   a second intermediate annular wall portion extending from an interval in a thickness direction from the cylindrical outer wall surface of the cylindrical filter, and
   a range from the second intermediate annular wall portion to a second outer corner portion that is a boundary portion between the second annular end surface and the cylindrical outer wall surface or a range from the second intermediate annular wall portion to a second inner corner portion that is a boundary portion between the second annular end surface and the cylindrical inner wall surface, and
a thickness of the second intermediate annular wall portion has a thickness equal to or less than ½ of a thickness of the second annular end surface, and a distance (L11) from an intermediate position of a thickness of the second intermediate annular wall portion to the cylindrical outer wall surface and a distance (L12) from the intermediate position of the thickness of the second intermediate annular wall portion to the cylindrical inner wall surface satisfy a relationship of L11<L12, L11=L12, or L11>L12.

4. A manufacturing method for the cylindrical filter for a pyrotechnic device according to claim 1, the manufacturing method comprising
   winding an elongated filter material, and
   welding and fixing a winding start and a winding end.

5. A manufacturing method for the cylindrical filter for a pyrotechnic device according to claim 2, the manufacturing method comprising
   winding an elongated filter material, and
   welding and fixing a winding start and a winding end.

6. A manufacturing method for the cylindrical filter for a pyrotechnic device according to claim 3, the manufacturing method comprising
   winding an elongated filter material, and
   welding and fixing a winding start and a winding end.

7. The gas generator according to claim 1, wherein
   the upper annular inclined surface is inclined outward and downward in the radial direction from an outer periphery of the top plate, and
   the lower annular inclined surface is inclined outward and upward in the radial direction from an outer periphery of the bottom plate.

8. A pyrotechnic device, comprising:
   a housing having an annular inclined surface; and
   a cylindrical filter accommodated inside the housing, the cylindrical filter including,
      an annular end surface configured to oppose the annular inclined surface of the housing,
      a cylindrical wall surface extending from the annular end surface, and
      a weakened portion, integrally formed with a remaining part of the cylindrical filter, and extending from the annular end surface, wherein
      the weakened portion includes an annular wall portion that protrudes from the annular end surface and has a thickness smaller than a thickness of the annular end surface, the annular wall portion including an outer peripheral surface and an inner peripheral surface, and wherein
   when the weakened portion is bent inward in a radial direction of the housing, an entire portion of the outer peripheral surface of the weakened portion is in contact with the annular inclined surface of the housing, and the inner peripheral surface of the weakened portion and a remaining portion of the annular end surface define a space, and
   when the weakened portion is bent outward in the radial direction of the housing, an entire portion of the inner peripheral surface of the weakened portion is in contact with the annular inclined surface of the housing, and the outer peripheral surface of the weakened portion and the remaining portion of the annular end surface define a space.

9. The pyrotechnic device, according to claim 8, further comprising:
   an ignition device accommodated in the housing;
   a gas generating agent or pressurized gas serving as a gas generation source accommodated in the housing; wherein
   the housing includes a plate, a peripheral wall portion, and a gas discharge port,
   the annular inclined surface being formed in a boundary portion between the plate and the peripheral wall portion,
   the weakened portion of the annular end surface being deformed inward in the radial direction, the cylindrical filter being disposed in a gas discharge path to which combustion gas generated by burning the gas generating agent is discharged from the gas discharge port, and
the deformed weakened portion of the annular end surface being, as an annular surface, in contact with an inner surface of the annular inclined surface.

10. The pyrotechnic device according to claim 9, wherein the annular inclined surface is inclined with respect to the plate and extends in the radial direction from an outer periphery of the plate.

* * * * *